Patented Nov. 26, 1929

1,737,458

UNITED STATES PATENT OFFICE

MAX HARTMANN AND JOHANN KÄGI, OF BASEL, SWITZERLAND, ASSIGNORS TO SOCIETY OF CHEMICAL INDUSTRY IN BASLE, OF BASEL, SWITZERLAND

QUATERNARY AMMONIUM COMPOUND AND PROCESS OF MAKING SAME

No Drawing. Application filed July 19, 1928, Serial No. 294,046, and in Switzerland July 26, 1927.

The invention relates to the manufacture of new quaternary ammonium compounds of acylated alkylenediamines of the general formula

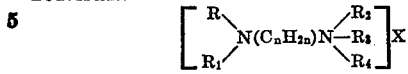

(wherein R means H, acyl or a hydrocarbon radical, $R_1$ means acyl, $R_2$, $R_3$ and $R_4$ mean a hydrocarbon radical such as alkyl, aryl, aralkyl, X means any monovalent anion and $n$ a whole number) and consists in treating mono-acylated or unsymmetrical diacylated alkylenediamines, such as are described in the U. S. specification No. 1,534,525, with an alkylating agent such as dimethyl-sulfate, methyliodide, benzylchloride, p-toluene-ethylsulfonate and so on.

These new products have pronounced soaping properties even in alkaline solution, whilst the compounds described in the U. S. specification 1,534,525 have the disadvantage of being precipitated from their solutions by means of alkalies.

The new products are easily soluble in water and in an alkaline or acid medium. They are applicable for technical and therapeutic purposes.

The following examples illustrate the invention, the parts being by weight:—

Example 1

380 parts of oleyl-diethylethylenediamine are mixed with 142 parts of methyl-iodide. Interaction sets in with much evolution of heat. The product forms an oleaginous mass.

Example 2

380 parts of oleyl-diethylethylenediamine are mixed with 126 parts of dimethylsulfate and the whole is strongly stirred for some time. After cooling the new product remains as a viscous oil, very soluble in water and in alkaline or acid medium.

An aqueous solution of the same product may be obtained directly by executing the reaction in presence of water. It may be employed for technical or therapeutic purposes, for example as liquid soap of great creaming properties being indifferent towards alkalies or acids.

Example 3

382 parts of stearyl-diethylethylenediamine are melted and stirred strongly with 126 parts of dimethylsulfate. The product of the reaction forms a mass resembling soap.

Example 4

380 parts of oleyl-diethylethylenediamine are mixed with 142 parts of benzylchloride and heated at about 100° C. After about 7 hours the benzylchloride has disappeared. The new oleaginous product dissolves easily in water.

Example 5

324 parts of unsymmetrical dibenzoyl-diethylethylenediamine are mixed with 142 parts of methyl-iodide. The new product forms white crystals melting at 200° C.

What we claim is:—

1. The process of manufacturing new quaternary ammonium compounds by treating an acylated diamine of the general formula

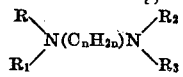

(wherein R means H, acyl or a hydrocarbon radical, $R_1$ means acyl, $R_2$ and $R_3$ mean the hydrocarbon radicals alkyl, aryl or aralkyl and $n$ a whole number) with any alkylating agent.

2. The process of manufacturing new quaternary ammonium compounds by treating an acylated diamine of the general formula

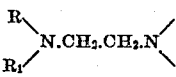

(wherein R means H, acyl or a hydrocarbon radical, $R_1$ means acyl, $R_2$ and $R_3$ mean the hydrocarbon radicals alkyl, aryl or aralkyl) with any alkylating agent.

3. The process of manufacturing new quaternary ammonium compounds by treating an acylated diamine of the general formula

(wherein $R_1$ means acyl, $R_2$ and $R_3$ mean the hydrocarbon radicals alkyl, aryl or aralkyl) with any alkylating agent.

4. The process of manufacturing new quaternary ammonium compounds by treating an acylated diamine of the general formula

(wherein $R_1$ means an aliphatic acyl, $R_2$ and $R_3$ mean the hydrocarbon radicals alkyl, aryl or aralkyl) with any alkylating agent.

5. The process of manufacturing new quaternary ammonium compounds by treating an acylated diamine of the general formula

(wherein $R_1$ means oleyl, $R_2$ and $R_3$ mean the hydrocarbon radicals alkyl, aryl or aralkyl) with any alkylating agent.

6. The process of manufacturing new quaternary ammonium compounds by treating an acylated diamine of the general formula

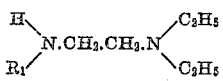

(wherein $R_1$ means oleyl) with any alkaylating agent.

7. The process of manufacturing mono-oleyl-diethyl-methyl-ethylenediammonium-methylsulfate by treating mono-oleyl-diethylethylenediamine of the formula

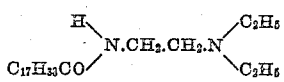

with dimethylsulfate.

8. As new products the quaternary ammonium compounds of acylated alkylenediamines of the formula

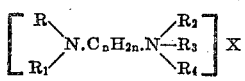

(wherein R means H, acyl or a hydrocarbon radical, $R_1$ means acyl, $R_2$, $R_3$ and $R_4$ mean the hydrocarbon radicals alkyl, aryl, aralkyl, X means any monovalent anion and $n$ a whole number), which products are soluble in water and in alkaline or in acid medium and have pronounced soaping properties.

9. As new products the quaternary ammonium compounds of acylated alkylenediamines of the general formula

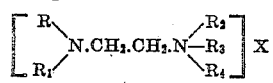

(wherein R means H, acyl or hydrocarbon radical, $R_1$ means acyl, $R_2$, $R_3$ and $R_4$ mean the hydrocarbon radicals, alkyl, aryl, aralkyl and X means any monovalent anion), which products are soluble in water and in alkaline or in acid medium and have pronounced soaping properties.

10. As new products the quaternary ammonium compounds of acylated alkylenediamines of the general formula

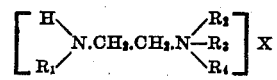

(wherein $R_1$ means acyl, $R_2$, $R_3$ and $R_4$ mean the hydrocarbon radicals, alkyl, aryl, aralkyl and X means any monovalent anion), which products are soluble in water and in alkaline or in acid medium and have pronounced soaping properties.

11. As new products the quaternary ammonium compounds of acylated alkylenediamines of the general formula

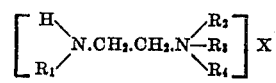

(wherein $R_1$ means an aliphatic acyl, $R_2$, $R_3$ and $R_4$ mean the hydrocarbon radicals alkyl, aryl, aralkyl and X means and monovalent anion), which products are soluble in water and in alkaline or in acid medium and have pronounced soaping properties.

12. As new products the quaternary ammonium compounds of acylated alkylenediamines of the general formula

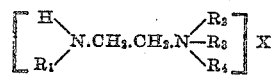

(wherein $R_1$ means oleyl, $R_2$, $R_3$ and $R_4$ mean the hydrocarbon radicals, alkyl, aryl, aralkyl and X means any monovalent anion), which products are soluble in water and in alkaline or in acid medium and have pronounced soaping properties.

13. As new products the quaternary ammonium compounds of acylated alkylenediamines of the general formula

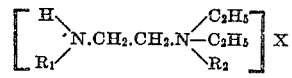

(wherein $R_1$ means oleyl, $R_2$ the hydrocarbon radicals alkyl, aryl, aralkyl and X any monovalent anion), which products are soluble in water and in alkaline or in acid medium and have pronounced soaping properties.

14. As new products the mono-oleyl-diethyl-methylethylene-diammonium-methylsulfate of the formula

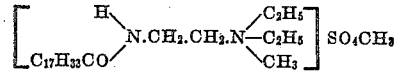

which constitutes a yellowish viscous oil, very soluble in water and in alkaline or in acid medium and has pronounced soaping properties.

In witness whereof we have hereunto signed our names this 7th day of July, 1928.

MAX HARTMANN.
JOHANN KÄGI.